United States Patent
Schwartz et al.

(10) Patent No.: US 6,303,530 B1
(45) Date of Patent: Oct. 16, 2001

(54) PREPARATION OF UNIFORMLY IMPREGNATED EXTRUDATE CATALYST

(75) Inventors: Michael M. Schwartz; William J. Reagan; Jeffrey T. Miller, all of Naperville, IL (US)

(73) Assignee: BP Corporation North America Inc., Chicago, IL (US)

( * ) Notice: Subject to any disclaimer, the term of this patent is extended or adjusted under 35 U.S.C. 154(b) by 0 days.

(21) Appl. No.: 09/358,960

(22) Filed: Jul. 22, 1999

Related U.S. Application Data

(63) Continuation of application No. 08/769,203, filed on Dec. 18, 1996, now abandoned.

(51) Int. Cl.[7] ............... B01J 29/06; B01J 21/00; B01J 29/00; B01J 29/08; B01J 29/04
(52) U.S. Cl. ............... 502/66; 502/63; 502/64; 502/74; 502/79; 502/86; 502/262; 502/326; 502/327; 502/333; 502/334; 502/339
(58) Field of Search ............... 502/60, 63, 64, 502/66, 74, 79, 86, 262, 326, 339, 407, 414, 415, 327, 333, 334

(56) References Cited

U.S. PATENT DOCUMENTS

| | | | |
|---|---|---|---|
| 3,130,007 | 4/1964 | Breck | 23/113 |
| 3,216,789 | 11/1965 | Breck et al. | 23/113 |
| 3,293,192 * | 12/1966 | Maher et al. | 252/430 |
| 3,449,070 * | 6/1969 | McDaniel et al. | 23/111 |
| 3,779,899 | 12/1973 | Mears | 208/143 |
| 3,897,327 | 7/1975 | Ward | 208/111 |
| 3,917,543 | 11/1975 | Bolton et al. | 252/455 |
| 3,926,780 | 12/1975 | Ward | 208/111 |
| 3,943,051 | 3/1976 | Ward | 208/111 |
| 3,945,943 | 3/1976 | Ward | 252/455 |
| 4,190,553 | 2/1980 | Ward | 252/412 |
| 4,357,265 * | 11/1982 | Chiang | 252/455 Z |
| 4,458,025 | 7/1984 | Lee et al. | 502/66 |
| 4,556,646 | 12/1985 | Bezman | 502/66 |
| 4,591,576 * | 5/1986 | Chiang et al. | 502/65 |
| 4,608,356 * | 8/1986 | Buss et al. | 502/66 |
| 4,839,320 * | 6/1989 | Trowbridge et al. | 502/66 |
| 4,855,036 * | 8/1989 | Chiang et al. | 208/120 |
| 4,914,068 | 4/1990 | Cross et al. | 502/74 |
| 5,106,803 * | 4/1992 | Mohr et al. | 502/66 |
| 5,147,526 | 9/1992 | Kukes et al. | 208/111 |
| 5,160,601 * | 11/1992 | Pecoraro | 208/120 |
| 5,190,903 * | 3/1993 | Steigleder | 502/79 |
| 5,206,194 | 4/1993 | Clark | 502/26 |
| 5,256,392 * | 10/1993 | Shamshoum | 423/717 |
| 5,348,924 | 9/1994 | Potter et al. | 502/66 |
| 5,384,296 | 1/1995 | Tsao | 502/66 |
| 5,391,291 | 2/1995 | Winquist et al. | 208/143 |
| 5,500,109 | 3/1996 | Keville et al. | 208/111 |

FOREIGN PATENT DOCUMENTS

| | | | |
|---|---|---|---|
| 0309139 | 3/1989 | (EP) | B01J/29/06 |
| 2500326 | 8/1982 | (FR) | B01J/29/12 |
| 0458378 | 11/1991 | (NL) | B01J/29/06 |
| 8904860 | 6/1989 | (WO) | C10G/35/085 |

OTHER PUBLICATIONS

Two segments from *Experimental Methods in Catalytic Research* (vol. II) entitled: "Molecular Sieve Zeolites" by A.P. Bolton pp. 1–41 and "Preparation and Characterization of Supported Metal Catalysts" by R.L. Moss pp. 43–93, published by Academic Press (1976).

(List continued on next page.)

Primary Examiner—Steven P. Griffin
Assistant Examiner—Cam N. Nguyen
(74) Attorney, Agent, or Firm—Ekkehard Schoettle

(57) ABSTRACT

A method for preparing a catalyst having one or more noble metals disposed in a relatively homogeneous distribution on a base which includes an inorganic refractory binder and a zeolite. The method provides for uniformly depositing noble metals on the base after it is formed, without unnecessarily displacing desirable nonframework cations, such as sodium, from the zeolite.

18 Claims, 1 Drawing Sheet

OTHER PUBLICATIONS

An article entitled: "Preparation of PtHY Catalysts—Influence on the Catalytic Properties of the Complexes Used as Platinum Precursors" by M. Guerin, C. Kappenstein, F. Alvarez, G. Giannetto, and M. Guisnet published in *Applied Catalysis*, 45 (1988), pp. 325–333.

An article entitled: "Properties of the Metallic Nickel in Reduced NaNiY Zeolite Catalysts" by K.H. Bager, F. Vogt, and H. Bremer published in Molecular Sieves–II—ACS Symposium Series 40, *American Chemical Society* (1977), pp. 528–537.

An article entitled: "Metallic Clusters in Zeolites" by J.B. Uytterhoeven of Centrum voor Oppervlaktescheikunde en Colloidal Scheikunde, Katholieke Universiteit Leuven, De Croylaan 42, B–3030 Leuven (Heverlee), Belgium (Mar. 1978), pp. 53–69.

An article entitled: "Elementary Steps in the Formation of Highly Dispersed Palladium in NaY" by S.T. Homeyer and W. M. H. Sachtler published in *Journal of Catalysis*, 117 (1989), pp. 91–101.

An article entitled: "Chimie Minerale" by F. Ribeiro, C. Marcilly and G. Thomas, published in C.R. Hebd. Seances Acad. Sci., Ser. C (Oct. 23, 1978), pp. 431–434.

An article entitled: "Etude de la Technique D'Echange Ionique Avec Competition" by F. Ribeiro and C. Marcilly, published in *Revue De L'Institut Francais du Petrole*, vol. 34 (May–Jun. 1979), pp. 405–428.

\* cited by examiner

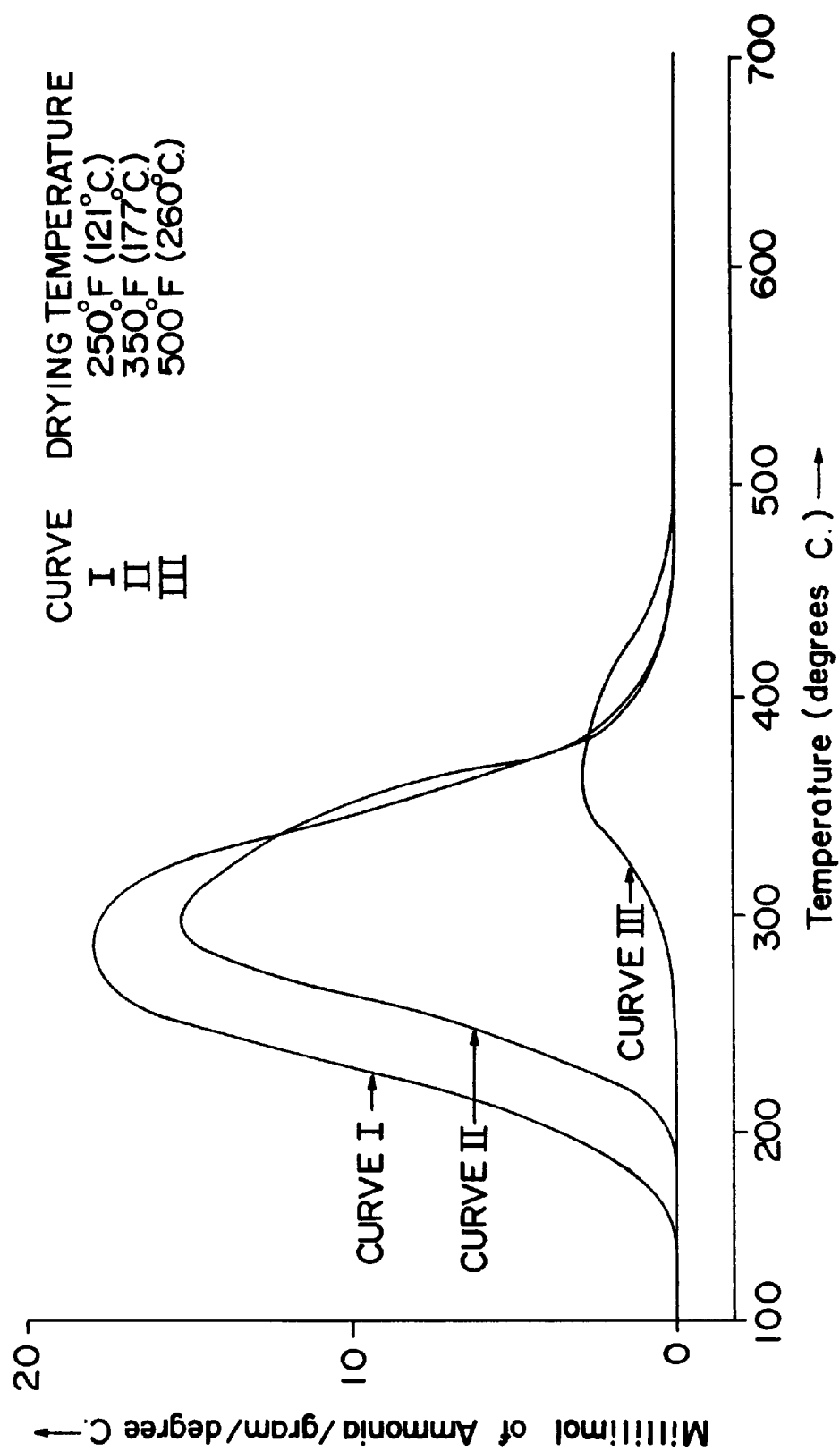

PREPARATION OF UNIFORMLY IMPREGNATED EXTRUDATE CATALYST

This is a continuation, of application Ser. No. 08/769,203, filed Dec. 18, 1996, now abandoned.

BACKGROUND OF THE INVENTION

1. Field of the Invention

The present invention relates to a method for preparing an extrudate catalyst having a relatively homogeneous metal distribution, as compared to the product of comparable previously known methods. More specifically, the invention relates to a method for manufacturing a catalyst base material and for impregnating one or more metals on the catalyst base in a relatively homogeneous distribution.

2. Description of the Prior Art

Zeolitic catalysts containing sodium and noble metals have been offered for sale by several catalyst vendors, particularly as hydrocarbon saturation catalysts for making diesel fuels which are relatively low in aromatics hydrocarbon content. Such catalysts and methods for their manufacture are described, for example, in U.S. Pat. No. 5,147,526 issued to Kukes et al. and assigned to the assignee of the present invention and in U.S. Pat. No. 5,391,291 issued to Winquist et al. Typically, the catalysts are prepared by adding noble metals, such as platinum and palladium, through an incipient wetness impregnation technique to a Y zeolite powder which is subsequently compounded with a binder and extruded to produce an extrudate catalyst. The extrudate catalyst is dried and subjected to a heat treatment, known as calcining, which includes eating the extrudate catalyst to a temperature in excess of 500 degrees F. The sodium content of the final product is normally considered an important variable.

Catalysts prepared by adding noble metals to a zeolite powder before extruding are entirely satisfactory for many purposes. Indeed, they are widely favored for their uniform disposition of noble metals throughout the extrudate. However, the practice of adding noble metals to a zeolite powder before compounding with a binder and extruding adds to the cost of manufacture because a significant fraction of such noble metals is unavoidably lost in the course of handling the powder.

The catalyst manufacturing industry has long recognized a need for alternatives to the practice of adding noble metals to a zeolite powder before compounding and extruding. Researchers have attempted, for example, to impregnate noble metals by introducing a metal-containing impregnation solution to pre-formed extrudate blanks, which include zeolite and a binder and have previously been extruded, dried and calcined. Nevertheless, the metals distribution on extrudate catalysts prepared by impregnating pre-formed blanks is still generally unpredictable and, all too often, non-homogeneous.

U.S. Pat. No. 3,779,899 issued to Mears reports an aromatic saturation catalyst prepared by impregnating platinum onto an acidic, previously stabilized Y zeolite support, and by calcining the resulting composite at temperatures above 1000 degrees F. The final sodium content reportedly should be less than 3 weight percent (as $Na_2O$), preferably less than 1.5 percent. The Y zeolite support is described as being stabilized by one of two general procedures, or a combination of both. In one stabilization procedure, at least about 80 percent of the original sodium ions are back-exchanged with a solution of polyvalent metal salt and then calcined. In another stabilization procedure, substantially all of the exchange sites are converted to decationized and/or hydrogen ion sites by exhaustive exchange with ammonium ions, followed by a hydrothermal treatment. Thereafter, platinum is reportedly added to the previously stabilized Y zeolite by conventional procedures. The Mears patent also reports that, in cases where the zeolite has previously been converted to a hydrogen form, it is desirable to reconvert the base to the ammonium form prior to exchange with platinum solutions. The Mears patent states that the zeolite base may be formed into the shape desired for the final catalyst either before or after the addition of platinum.

U.S. Pat. No. 3,897,327 issued to Ward describes a stabilized Y zeolite composition which is prepared from sodium Y zeolite by partial exchange of ammonium ions for sodium ions, steam calcination, and further ion exchange of sodium ions to reduce the final $Na_2O$ content below about one weight percent. The stabilized zeolite is reportedly admixed with a finely divided refractory oxide of a difficultly reduced metal. For use as a catalyst in acid catalyzed reactions such as alkylation, isomerization, cracking, and hydrocracking, the Ward '827 patent reports that the stabilized zeolite from the second ammonium ion exchange step is subjected to a second calcination at temperatures between about 600 and 1500 degrees F. The Ward '827 patent states that a hydrogenating metal component, such as palladium or platinum, may be impregnated into the powdered zeolite after the second ammonium ion exchange, or into the catalyst pellets prior to the final calcination step. The Ward '827 patent provides no guidance for obtaining homogeneous impregnation of the metal.

U.S. Pat. No. 4,556,646 issued to Bezman describes a method of manufacture which includes impregnating a formed catalyst base with a solution of a noble metal, such as palladium and platinum, and an ammonium salt in order to prepare a noble metal and Y-type zeolite catalyst having a highly uniform radial distribution of the noble metal. The Bezman patent states that the ammonium salt is present in a concentration corresponding to at least 100%, and especially 200%, of the ion-exchange capacity of the zeolite component of the catalyst base. The impregnated base is reportedly permitted to stand between impregnating and drying for a time sufficient to produce a radially uniform distribution. However, the relatively high concentration of ammonia salt required for the method described in the Bezman patent tends to displace from the zeolite desirable nonframework cations such as, for example, sodium.

In spite of significant efforts by earlier researchers, need still exists for an improved method for preparing a uniformly impregnated extrudate catalyst including a zeolite, a noble metal, and a predetermined amount of sodium. Preferably the improved method avoids displacing desirable nonframework cations which are present on the zeolite at the time of extrusion. Most preferably, the method produces extrudates which are sufficiently hard for practical use in industrial chemical reactors.

SUMMARY OF THE INVENTION

The present invention is a method for preparing an extrudate catalyst having one or more noble metals disposed in a relatively homogeneous distribution on a base which includes a non-zeolitic inorganic oxide binder and a zeolite having a predetermined amount of sodium as a nonframework cation. The method comprises extruding a paste containing a binder and a zeolite having ammonium and sodium as nonframework cations to produce an extrudate containing the zeolite in sodium and ammonium form, and maintaining the extrudate zeolite in sodium and ammonium form until the extrudate is blended with an aqueous impregnating solution containing one or more dissolved metal salts. The metal salt is impregnated more uniformly on the base, as compared to a relatively nonuniform impregnation which traditionally takes place in the absence of ammonium ions.

The extrudate zeolite is maintained in predominantly ammonium form throughout a drying stage which precedes the blending with the impregnation solution by, for example, drying at a temperature of less than about 500 degrees F. for a period of less than about twenty hours. Alternatively, the extrudate may be dried at a temperature higher than about 500 degrees F. provided that the zeolite is converted to predominantly ammonium form, as by contact with room temperature ammonia gas, before blending with impregnation solution. In contrast with traditional methods which include relatively large amounts of ammonium in the impregnation solution, the present invention controls the amount of sodium retained on the dried extrudate by limiting the amount of ammonium ions in the impregnation solution.

Drying the extrudate after extrusion and before blending with the impregnation solution at a temperature in the range of about 250 to about 500 degrees F. produces an extrudate having sufficient mechanical strength and attrition resistance for loading and practical use in industrial chemical reactors. Moreover, the invention can provide even stronger and harder uniformly impregnated extrudate when the extrudate is dried at a temperature of more than about 500 degrees F. and subsequently converted to predominantly ammonium form, as by contact with room temperature ammonia gas, before blending with the impregnation solution.

In one aspect, the invention is a method for preparing a uniformly impregnated extrudate catalyst which comprises extruding a mixture which includes water, a non-zeolitic refractory inorganic binder selected from the group consisting of alumina, silica, and mixtures thereof, and a zeolite comprising as nonframework cations a major amount of ammonium and a measurable initial amount of sodium to produce an extrudate including the binder and the zeolite. The extrudate is dried at less than about 500 degrees F. Moreover, the extrudate is maintained at less than about 500 degrees F. during the period from the start of extruding to immediately before impregnating. A noble metal selected from the group consisting of platinum, palladium, and mixtures thereof is impregnated on the extrudate by exposing the extrudate to an impregnating solution which includes an aqueous solvent, a water-soluble compound containing the metal, and an amount of ammonium ions which is in the range of about 0.01 to about 60 percent of the ion exchange capacity of the zeolite and, thereafter, vaporizing the solvent. The impregnated extrudate is calcined to produce a uniformly impregnated extrudate catalyst including the metal, the binder, the zeolite, and a predetermined amount of sodium which is at least about 50 percent of the initial amount.

In another aspect, the invention is a method which comprises extruding a mixture, as described above, to produce an extrudate including the binder and the zeolite. The extrudate is dried and calcined at a temperature sufficient to decompose nonframework ammonium ions in the zeolite, thereby driving off ammonia gas and converting the nonframework ammonium ions. Such calcining temperatures are associated with extrudates having superior mechanical strength.

A portion of the nonframework cations in the calcined zeolite is now converted to ammonium ions by contacting the zeolite with ammonia gas or an aqueous solution including a water-soluble ammonium compound during the period from an extruding of the extrudate to immediately before the impregnating of the extrudate. The extrudate is maintained at less than about 500 degrees F. during the period from the end of converting nonframework cations in the zeolite to ammonium to the start before impregnating.

The extrudate is impregnated with a noble metal selected from the group consisting of platinum, palladium, and mixtures thereof by exposing the extrudate to an impregnating solution which includes an aqueous solvent, a water-soluble compound containing the metal, and an amount of ammonium which is in the range of about 0.01 to about 60 percent of the ion exchange capacity of the zeolite and, thereafter, vaporizing the solvent. The impregnated extrudate is calcined to produce a uniformly impregnated extrudate catalyst including the metal, the binder, the zeolite, and a predetermined amount of sodium.

In yet another aspect the invention is a method which comprises converting nonframework hydronium ions in an extrudate zeolite to ammonium ions by contacting the extrudate with ammonia gas during the period from an extruding of the extrudate to before the impregnating of the extrudate.

BRIEF DESCRIPTION OF THE DRAWINGS

FIG. 1 is a graph depicting the rate release of ammonia as a function of temperature for three different samples over the course of a temperature programmed desorption procedure. Curve I relates to a sample which is dried at a relatively low temperature and then subjected to the desorption procedure. Curve I demonstrates the greatest rate of ammonia desorption and the greatest total release of ammonia over the course of the desorption procedure. Curve II and Curve III, respectively, relate to samples which are dried at progressively higher temperatures and subjected to the desorption procedure.

DETAILED DESCRIPTION OF PREFERRED ASPECTS OF THE INVENTION

In a preferred aspect, the invention is a method for preparing a uniformly impregnated extrudate catalyst including a zeolite, a noble metal, and a predetermined amount of sodium. Impregnation is the deposition of metals or metal-containing ions on a solid substrate by soaking with an aqueous solution containing a dissolved metal salt or other metal compound followed by drying and thermal or chemical decomposition of the metal salt or the metal compound. It is contemplated that a cation of the metal salt or a cation of the metal compound may convert one nonframework cation of the zeolite to another cation during the course of the impregnation.

For the present purposes, uniform impregnation is defined as an impregnation which produces a visibly homogeneous or analytically homogeneous distribution of the deposited metal or metal-containing ions throughout one piece of the substrate. The distribution is deemed visibly homogeneous if the distribution is discernible by the naked eye either in an oxidized state or a reduced state, and the distribution so discerned appears to be homogeneous. Nonhomogeneous distributions are characterized by mottled colors, varying shades, or eggshell patterns in either the oxidized state or the reduced state. In the event that the distribution is not discernible in the oxidized state and not discernible in the reduced state, the distribution may be quantitatively analyzed by, for example, scanning electron microscopy. In that event, the distribution is deemed to be analytically homogeneous if no local concentration in the piece differs from the volumetrically weighted mean average concentration for the piece by more than five percent of the mean concentration.

The method comprises forming a mixture, such as a paste, which includes water, a zeolite, and a non-zeolitic refractory inorganic binder into aggregates, particles, pieces, chunks, pellets, rings, spheres, wagon wheels, trilobes, tetralobes and the like in a size suitable for employment in a reactor. Pelleting or extruding, preferably the latter, may be used to accomplish the forming but in either case the product of forming is referred to herein, for convenience, as extrudate. The extrudate comprises the binder and the zeolite. A discussion of the extruding process is presented in U.S. Pat. No. 5,348,924 issued to Potter et al., which patent is hereby incorporated by reference in its entirety, and particularly for its teachings regarding paste formulation and extrusion.

The binder is selected from alumina, silica, magnesia, beryllia, zirconia, titania, thoria, chromia, combinations thereof such as silica-alumina, silica-magnesia, silica-alumina-beryllia, naturally occurring clays containing refractory oxides or combinations thereof and the like. Preferably, the binder is selected from the group consisting of alumina, silica, and mixtures thereof; most preferably the binder is alumina. The weight ratio of binder to zeolite is preferably in the range of about 5:95 to about 60:40, more preferably about 10:90 to about 30:70.

Zeolites which are suitable for use in the present invention include large pore zeolites such as zeolite Y, rare-earth-exchanged zeolite Y, ultra-stable zeolite Y, de-aluminated zeolite Y, zeolite L, zeolite beta, ZSM-3, ZSM4, ZSM-18, ZSM-20; medium large pore zeolites such as ZSM-5, ZSM-11, ZSM-12, ZSM-23, ZSM-35, ZSM-38, ZSM48; and other similar materials. Of these, zeolite Y, rare-earth-exchanged zeolite Y, ultra-stable zeolite Y, de-aluminated zeolite Y, ZSM-5, ZSM-11 and ZSM-23 are preferred, and zeolite Y is especially preferred. Zeolite Y is described in U.S. Pat. No. 3,130,007 issued to Breck et al. which is hereby incorporated by reference in its entirety, particularly for its teachings regarding an X-ray diffraction pattern for zeolite Y. Zeolite L is described in U.S. Pat. No. 3,216,789 issued to Breck et al. which is hereby incorporated by reference in its entirety, particularly for its teachings regarding an X-ray diffraction pattern for zeolite L.

Zeolites are complex, crystalline inorganic polymers based on a framework of $AlO_4$ and $SiO_4$ tetrahedra linked to each other by sharing of oxygen ions. Each $AlO_4$ tetrahedron in the framework requires one unit of electrical charge from a charge-balancing cation in order to maintain overall electro-neutrality in the zeolite. These nonframework cations are generally mobile and ordinarily undergo ion exchange under favorable conditions.

However, the exchange behavior of a particular nonframework cation is difficult to predict because such behavior depends on the nature of the cation, temperature, concentration, and the nature of an associated anion. In addition to being modified by ion exchange, zeolites may also be modified by, for example, the decomposition of ammonium and alkylammonium ions or the hydrolysis of polyvalent cations. Fortunately, the success of the invention does not depend on a theoretical explanation. For the present purposes, conversion of a nonframework cation is defined as any modification of one nonframework cation for another or replacement of one nonframework cation for another. Such conversion includes, but is not limited to, adsorbing and ion exchange.

Ion exchange capacity, also termed base exchange capacity, of a given amount of zeolite is defined for the present purposes as the number of equivalents of nonframework cation required for electrical neutrality, assuming that each aluminum atom in the zeolite is coordinated with four oxygen atoms. The number of moles of alumina present in the given amount of zeolite is calculated from a chemical analysis of the zeolite as initially synthesized. The concept of base exchange capacity for zeolites and the method for its calculation are set forth in detail at pages 13 through 29 of Experimental Methods in Catalytic Research, Vol. II edited by Anderson et al. (copyright 1976 by Academic Press, Inc. of New York).

Preferably, the zeolite includes a major amount of ammonium and an initial measurable amount of sodium as nonframework cations at the time of extruding. More preferably, the zeolite charged to the extruding comprises an amount of ammonium ions equivalent to about 60 percent or more of the ion exchange capacity of the zeolite, most preferably about 70 percent or more. In each of these cases, production of uniformly impregnated extrudate catalyst is advanced by maintaining the extrudate in a temperature range of about room temperature to less than about 500, more preferably less than about 350, and most preferably less than about 250 degrees F. throughout the period from extruding to the onset of impregnating, inclusive. It is believed that maintaining the extrudate within the specified temperature range throughout the period tends to increase the amount of ammonium ions retained on the zeolite at the onset of extruding, and that the presence of ammonium ions on the zeolite during impregnating promotes uniform metal impregnation.

The period of temperature maintenance encompasses drying of the extrudate, which is also accomplished within the specified temperature range. Otherwise, the drying is conventional. Drying time is in the range of about two hours to about 4 days, at the end of which time the extrudate is at least dry to the touch. Drying the extrudate before impregnating removes water from the extrudate which might otherwise interfere with the action of the impregnating solution on the extrudate. Drying the extrudate before impregnation is also associated with a mechanically stronger extrudate catalyst.

The noble metals are platinum, palladium, gold, silver, rhodium, iridium, ruthenium, and osmium. Any of the noble metals or any mixtures thereof are suitable for use in the present invention. Platinum, palladium and mixtures thereof are especially preferred. One or more of the noble metals is impregnated on the extrudate by exposing the extrudate to an aqueous impregnating solution containing the metal or containing a salt or a compound which includes the noble metal. Preferably, the impregnating solution includes a water-soluble compound containing the metal.

The impregnating solution may include an amount of ammonium ions which is in the range of about 0.01 to about 60 percent, more preferably to about 25 percent, and most preferably to about 10 percent of the ion exchange capacity of the zeolite. Alternatively, the impregnating solution may be ammonium ion-free. It is especially preferred, although not mandatory, that the impregnation is performed in accordance with a well-known incipient wetness technique which utilizes a volume of impregnating solution similar to the total pore volume of a substrate, such as an extrudate, being impregnated. Hereinafter, when an amount of an ion is described as present in an impregnating solution but the volume of the solution is not specified, it is understood that the concentration for the ion is to be calculated by assuming that the solution volume is equal to the total pore volume of the extrudate.

Preferably, the extrudate is exposed to the impregnating solution for a period of about one-half to about twenty-four hours, more preferably about 2 to about 16 hours, and most preferably about 8 to about 14 hours. It is preferred that the volume of the impregnating solution is in the range of about 50 to about 200 percent of the total pore volume of the extrudate, with about 75 to about 125 percent being especially preferred. The noble metal in the impregnation is used most efficiently and its loss is minimized when the volume of the impregnation solution is similar to the total pore volume of the extrudate.

It is contemplated that the presence of ammonium ions in the impregnating solution enhances the uniformity of the impregnation. However, the ammonium ions tend to displace from the zeolite desirable nonframework cations such as, for example, sodium. Therefore, the amount of ammonium ions present in the impregnating solution should be minimized when it is important to retain certain nonframework cations in the extrudate catalyst.

For example, it is expected that at least about 50 percent of the initial amount of ammonium ions remains on the zeolite after exposure to an impregnating solution including an amount of ammonium which is in the range of about 0.01 to about 60 percent of the ion exchange capacity of the zeolite. At least about 85 percent of the initial amount of ammonium remains after exposure to an impregnating solution including ammonium in the range of about 0.01 to about 25 percent of the ion exchange capacity of the zeolite. More than 90 percent sodium retention is predicted when the amount of ammonium ions in the impregnating solution is limited to about 25 percent or less of the ion exchange capacity of the zeolite.

The extrudate catalyst includes a predetermined amount of sodium, preferably in the range of about 1.5 to about 8, more preferably about 1.5 to about 6, and most preferably about 1.5 to about 5 weight percent, based on the total weight of the zeolite. Especially preferred extrudate catalyst compositions for hydrogenation of unsaturated hydrocarbons are described in U.S. Pat. No. 5,147,526 issued to Kukes et al. and U.S. Pat. No. 5,391,291 issued to Winquist et al., which patents are hereby incorporated in their entirety, and especially for their teachings regarding hydrogenation catalyst composition. Practitioners will appreciate that the manufacture of extrudate catalysts which require inclusion of a predetermined amount of sodium is facilitated by methods of manufacture which retain a relatively large proportion of the initial amount of sodium despite exposure to impregnating solution.

After impregnating, the solvent portion of the impregnating solution is vaporized. The impregnated extrudate is calcined at a temperature above 500 degrees F., employing conventional techniques. A uniformly impregnated extrudate is produced which preferably includes the noble metal, the binder, the zeolite, and a pre-determined amount of sodium.

In another preferred aspect, the invention is a method for preparing a uniformly impregnated extrudate catalyst which comprises impregnating a noble metal on a previously formed extrudate, which is essentially identical to the extrudate described above. The previously formed extrudate is impregnated and calcined, as described above. This aspect of the invention relates, for example, to circumstances in which an impregnating party commercially obtains the extrudate from another party.

In yet another aspect, the invention is a method for preparing a uniformly impregnated extrudate catalyst which provides for at least two separate calcinations. By this method, conditions in the first calcination may be optimized independently of conditions in the second calcination without sacrificing uniformity of impregnation. For example, the first calcination is conducted at about 1000 degrees F. to enhance mechanical strength in the extrudate, while the second calcination is conducted at about 570 degrees F. to avoid agglomerating impregnated metals.

The method comprises extrudating a mixture which includes water, a non-zeolitic refractory inorganic binder selected from the group consisting of alumina, silica, and mixtures thereof, and a zeolite comprising as nonframework cations a measurable initial amount of sodium to produce an extrudate including the binder and the zeolite. The zeolite may also comprise ammonium as nonframework cations or, alternatively, the zeolite may be essentially ammonium ion-free as in, for example, a commercially available zeolite NaY in 100 percent sodium form.

The extrudate is dried and calcined for a first time. It is contemplated that the extrudate may have been dried or calcined previously, and also that the extrudate may be dried and calcined several times, and remain within the scope of the present invention. The calcining temperature is preferably at least about 500, more preferably at least about 800, and most preferably at least about 1000 degrees F. During this calcination, a significant fraction of any ammonium ions which may be present in the zeolite is thermally decomposed to release ammonia and, thereby, converted to hydrated or un-hydrated hydrogen-containing ions such as hydronium ions, hydroxyl ions, protons and the like.

At least a significant fraction of the nonframework cations in the zeolite is thereafter converted to ammonium ions. It is preferred that a major amount of the nonframework cations is converted to ammonium ions. More preferably, the amount of ammonium ions in the zeolite after the converting is equivalent to about 80 percent or more of the ion exchange capacity of the zeolite, most preferably about 90 percent or more.

Contacting the zeolite with ammonia gas converts nonframework hydronium ions, hydroxyl ions, protons and the like to ammonium ions. Preferably, the zeolite is contacted with ammonia gas at a temperature in the range of about room temperature to about 500 degrees F. for a period of about 5 minutes to about 12 hours. More preferably, the zeolite is contacted with ammonia gas at a temperature in the range of about room temperature to about 250 degrees F. for 15 minutes to about 3 hours. Contact with ammonia gas at these conditions converts hydronium ions, hydroxyl ions, protons and the like to ammonium ions, but has little or no effect on nonframework sodium ions.

Alternatively, nonframework ions are converted by contacting the zeolite with an aqueous solution including a water-soluble ammonium compound. In this alternative, the zeolite is preferably contacted with the aqueous solution including the water-soluble ammonium compound at a temperature in the range of about room temperature to about 212 degrees F., more preferably about 80 to about 160 degrees F., for a time period in the range of about 15 minutes to about 24 hours, more preferably about 2 hours to about 12 hours. It is preferred that the water-soluble ammonium compound is, for example, ammonia, aqueous ammonia, or an ammonium salt.

In order to avoid driving ammonia from the zeolite, the extrudate is maintained at a temperature of less than about 500, more preferably less than about 350, and most preferably less than about 250 degrees F. during the period from the end of converting nonframework cations to ammonium to the start of impregnating. Relatively higher amounts of ammonium as nonframework cations in the zeolite at the start of impregnation tend to enhance uniformity of noble metal deposition.

After converting, the extrudate is impregnated with one or more noble metals, as described above. The impregnating solution may contain ammonium ions or, alternatively, may be ammonium ion-free. As stated above, it is believed that ammonium ions in the impregnating solution enhance uniformity of impregnation while unavoidably displacing or converting at least a portion of nonframework cations, such as sodium.

The impregnated extrudate is dried and calcined for a second time. The calcining temperature is preferably more than about 250 degrees F., more preferably more than about 400 degrees F. It is preferred that the second calcining temperature is less than about 800 degrees F., more preferably less than about 600 degrees F.

An inspection procedure and several Examples are now presented in order to better communicate the invention. Neither the inspection procedure nor the Examples are intended to limit the scope of the invention in any way.

CATALYST INSPECTION PROCEDURE

Uniformity of impregnation is evaluated by visual inspection of individual pieces of the extrudate catalyst, both whole and fractured, in an oxidized state or, alternatively, in a reduced state. Extrudate catalysts which are uniformly impregnated with platinum and palladium have a homogeneous color throughout which is apparent to the naked eye, the homogeneous color being visible on external surfaces and on fractured surfaces. For zeolite Y and alumina extrudate catalysts having platinum and palladium concentrations in the ranges described above, the color associated with uniform impregnation in the oxidized state is a homogeneous cream. Conversely, oxidized extrudates of this type which appear mottled or brown at any surface are not uniformly impregnated. Extrudate catalyst is considered, for the present purposes, to be converted to the oxidized state by three hours of contact with air at 1000 degrees F.

For the same extrudate catalysts viewed in the reduced state, the color associated with uniform impregnation is a homogeneous light gray. Dark grays, mottling, and eggshell patterns indicate non-uniform metals impregnation in such reduced extrudate catalysts. Extrudate catalyst is considered to be converted to the reduced state by one hour of contact with flowing hydrogen at 750 degrees F. or by reaction with a saturated aqueous solution of tin chloride.

CATALYST PREPARATION

Example 1
Impregnating Calcined Extrudates

In order to communicate the difficulty of obtaining a uniform impregnation with extrudates which are calcined at 500 degrees F. after extrusion but before impregnation, four extrudates are dried at 250 degrees C. and calcined at 1000 degrees F. The calcined extrudates are impregnated with 0.9 weight percent palladium and 0.3 percent platinum utilizing four different procedures, as described below. Each of the calcined extrudates contains 70 percent zeolite Y and 30 percent alumina by weight, based on the total weight of the extrudate. As measured before extrusion, zeolite Y includes about 3 weight percent of sodium as nonframework cations, based on the total weight of the zeolite.

An impregnated extrudate designated 1A is prepared by exposing a portion of the calcined extrudate to an impregnating solution consisting of water and appropriate amounts of tetrammine palladium chloride and tetrammine platinum chloride in accordance with the well-known incipient wetness technique. The target amounts of palladium and platinum for the impregnated extrudate are 0.9 weight percent and 0.3 weight percent, respectively. The extrudate is not exposed to carbon dioxide before impregnation. Contact between the extrudate and the impregnating solution is maintained for sixteen hours to promote equilibration. Impregnated extrudate 1A appears brown in color when in the oxidized state. In the reduced state, impregnated extrudate 1A exhibits a dark gray color in a pattern associated with eggshell impregnation. Crush strength for the impregnated extrudate 1A is reported as 0.389 pounds per millimeter.

Impregnated extrudate 1B is prepared in substantially the same manner as impregnated extrudate 1A, except that ammonium nitrate is added to the impregnating solution to provide an amount of ammonium corresponding to 35 percent of the ammonium ion exchange capacity of the zeolite. The extrudate is not exposed to carbon dioxide vapor before impregnation. Impregnated extrudate 1B is a mottled gray brown color when in the oxidized state. In the reduced state, impregnated extrudate 1B is a nonuniform gray.

Impregnated extrudate 1C is also prepared in substantially the same manner as impregnated extrudate 1A, except that the calcined extrudate is exposed to carbon dioxide vapor from dry ice for five hours in a desiccator before impregnation. No ammonium nitrate is added to the impregnating solution. Impregnated extrudate 1C in the oxidized state is a dark rusty brown color.

Impregnated extrudate 1D is prepared in substantially the same manner as impregnated extrudate 1A, except that (a.) ammonium nitrate is added to the impregnating solution to provide an amount of ammonium corresponding to 35 percent of the ammonium ion exchange capacity of the zeolite, and (b.) the calcined extrudate is exposed to carbon dioxide vapor from dry ice for five hours in a desiccator before impregnation. Impregnated extrudate 1D is a mottled light brown in the oxidized state.

Inspection of impregnated extrudates 1A through 1D indicates that none are uniformly impregnated.

Example 2
Impregnating Dried-Only Extrudates

In order to better communicate the invention, four additional extrudates are dried at 250 degrees F. and impregnated without further heating. The dried-only extrudates are identical to the calcined extrudates described above on Example 1, except that they are not calcined. Each one of the four dried-only extrudates are impregnated utilizing, respectively, one of the four different procedures described above in regard to impregnated extrudates 1A through 1D. The impregnated extrudate which shares an impregnation procedure with impregnated extrudate 1A is designated 2A, and so on. Crush strength for the impregnated extrudate 2A is reported as 0.434 pounds per millimeter.

All four of the impregnated extrudates 2A through 2D exhibit a homogeneous cream color while in the oxidized state, and a homogeneous light gray color in the reduced state. The colors of impregnated extrudates 2A through 2D are consistent with uniform impregnation.

Crush strengths for the impregnated extrudates 1A and 2A are comparable. Therefore, it is expected that finished extrudate catalyst which might be fashioned from either of these impregnated extrudates would be sufficiently strong for commercial use. The procedures and appearance of the impregnated extrudates of Examples 1 and 2 are summarized below in Table I.

TABLE I

| Impregnated Extrudate | Equilibrate (hours) | Added NH$_4^+$ ion | Carbon Dioxide | Oxidized Color | Reduced Color |
|---|---|---|---|---|---|
| 1A (calcined) | 16 | No | No | Brown | Dark gray eggshell |
| 1B (calcined) | 16 | Yes | No | Mottled gray brown | Gray non-uniform |
| 1C (calcined) | 16 | No | Yes | Dark rusty brown | — |
| 1D (calcined) | 16 | Yes | Yes | Mottled light brown | — |
| 2A (dried only) | 16 | No | No | Cream uniform | Light gray uniform |
| 2B (dried only) | 16 | Yes | No | Cream uniform | Light gray uniform |
| 2C (dried only) | 16 | No | Yes | Cream uniform | Light gray uniform |
| 2D (dried only) | 16 | Yes | Yes | Cream uniform | Light gray uniform |

Inspection of Table I reveals that low temperature drying only of extrudate, without calcination before metals impregnation, is a key factor in obtaining a uniform distribution of metals. Improvements such as providing several hours at impregnation conditions to promote equilibration, adding excess ammonium ion to the impregnating solution, and exposing the extrudate to carbon dioxide immediately before impregnation appear to enhance metals distribution to some degree, but Table I is evidence that low temperature drying only of the extrudate, without calcination before metals impregnation, is of primary importance for uniform impregnation.

Example 3
Impregnating Dried-Only Extrudates with Less Metals

The dried-only procedure described above in regard to impregnated extrudate 2A is substantially repeated, except that the impregnating solution consists of water and appropriate amounts of tetrammine palladium chloride and tetrammine platinum chloride so as to impregnate dried-only extrudates with 0.675 weight percent palladium and 0.225 weight percent platinum, and that impregnation conditions are maintained for 18 hours to promote equilibration. Impregnated extrudate is produced and is seen to be a homogeneous cream color in the oxidized state. The extrudate is designated impregnated extrudate 3, and the procedure and observations are summarized below in Table II.

Example 4
Impregnating Dried-Only Extrudates with still Less Metals

The dried-only procedure described above in regard to impregnated extrudate 2A is substantially repeated, except that the impregnating solution consists of water and appropriate amounts of tetrammine palladium chloride and tetrammine platinum chloride so as to impregnate dried-only extrudates with 0.45 eight percent palladium and 0.15 weight percent platinum, and that impregnation conditions are maintained for 18 hours to promote equilibration. Impregnated extrudate is produced and is seen to be a homogeneous cream color in the oxidized state. The extrudate is designated impregnated extrudate 4, and the procedure and observations are summarized below in Table II.

Taken together, Examples 2, 3, and 4 demonstrate that the invention is capable of producing uniformly impregnated extrudates throughout a range of platinum and palladium loadings.

Example 5
Alleviating the Effects of Calcining

The calcined extrudate procedure described above in regard to impregnated extrudate 1A is substantially repeated, except that before impregnation the calcined extrudate is exposed to gaseous ammonia for thirty minutes. Impregnated extrudate is produced which exhibits a homogeneous cream color in the oxidized state. The extrudate is designated impregnated extrudate 5, and the procedure and observations are summarized below in Table II.

TABLE II

| Impregnated Extrudate | Equilibrate (hours) | Added NH$^{4+}$ ion | Carbon Dioxide | Oxidized Color | Reduced Color |
|---|---|---|---|---|---|
| 3 (less metals) | 18 | No | No | Cream uniform | — |
| 4 (still less metals) | 18 | No | No | Cream uniform | — |
| 5 (NH$_3$ gas) | 16 | No | No | Cream uniform | — |

Surprisingly, inspection of Table II indicates that treatment of the extrudate before impregnation with gaseous ammonia is another key factor in obtaining a uniform distribution of metals. Table II contains evidence that the deleterious effects of calcining before impregnation may be alleviated, or possibly reversed entirely, by exposure of the calcined extrudate to ammonia gas.

Example 6
Ammonia Desorption from Dried-Only Extrudates

Extrudates are dried at 250 degrees F. without further heating. The extrudates of this batch are identical to the calcined extrudates described above in Example 1, except that they are not calcined. The batch is divided into three lots for temperature programmed desorption testing. The first lot, designated 6A, receives no further treatment before the programmed desorption. The second lot, designated 6B, is dried further drying at 350 degrees F. The third lot is subjected to further drying at 500 degrees F. All three lots are heated in a controlled manner and, as each desorbs gaseous ammonia, the rate of ammonia desorption for each lot is measured. The rates of desorption are expressed as milliliters of ammonia per gram of extrudate per Centigrade degree of programmed temperature increase and plotted in FIG. 1 as a function of time.

A comparison of the functions which are depicted in FIG. 1 indicates that an increase in drying time and temperature is accompanied by a decrease in the amount of desorbing ammonia, and an increase in the temperature at which a peak rate of desorption occurs. More specifically, extrudate 6A desorbs a total of 1.76 millimol of ammonia per gram of extrudate over the course of the programmed test and exhibits a peak rate of absorption at 279 degrees C. (534 degrees F.), while extrudate 6B desorbs 1.33 millimol of ammonia per gram and exhibits a peak rate at 296 degrees C. (565 degrees F.). Extrudate 6C desorbs only 0.33 millimol of ammonia per gram and exhibits a peak rate at 362 degrees C. (684 degrees F.).

It is hypothesized that one effect of increasing drying time and temperature may be to convert nonframework cations of the zeolite Y included in the extrudate from ammonium ions to hydronium ions and ammonia gas. Alternatively, it is reasonable to speculate that increasing drying time and temperature serves to desorb ammonium ions from the surface of the alumina included in the extrudate and thereby enhance the ability of the alumina to adsorb other ionic species such as palladium- or platinum-containing species. In either case, the success of the invention does not stand or fall on the accuracy of the hypotheses. The above Examples communicate that the presence of ammonium ions on or in the extrudate immediately before impregnation serves to enhance the uniformity of metals impregnation on the extrudate.

CATALYST PERFORMANCE TESTING

Impregnated extrudates of interest are dried at 250 degrees F. for two hours, calcined at 1000 degrees F. for three hours, and permitted to cool. The calcined catalysts are dried immediately before loading, and a known and reproducible volume of the extrudate is loaded into a reactor of an automated, computer-controlled continuous downflow hydrotreating pilot plant. Traveling thermocouples measure the temperature profile in each reactor.

The extrudate is activated with hydrogen and a predetermined hydrogen flow rate through the reactor is established. A standard feedstock is metered into the reactor at a controlled liquid hourly space velocity. The feedstock contains 43.3 liquid volume percent aromatic hydrocarbons, as well as known amounts of sulfur and nitrogen, and has a 90% atmospheric boiling point of 632 degrees F. Reactor temperatures are ramped upward to meet target reaction conditions without undue hydrocracking. A reactor liquid product stream is sampled at prescribed intervals and the samples analyzed for aromatic hydrocarbon content.

Example 7
Performance of Uniformly Cream-Colored Extrudates

Impregnated extrudates 2A, 2B, and 3, as described above in Examples 2 and 3, are subjected to Catalyst Performance Testing in this Example. The testing confirms confirms that extrudates which include alumina and a sodium-containing zeolite are impregnated with palladium and platinum, and appear uniformly cream-colored in the oxidized state extrudate can perform acceptably as aromatic saturation catalysts.

The reactor liquid product streams for impregnated extrudates 2A and 2B are sampled at five days on stream, while the reactor liquid product stream for impregnated extrudate 3 is sampled at four days on stream. The samples are analyzed for liquid aromatic hydrocarbon content and the analyses are reported as 6.8 liquid volume percent, 7.9 liquid volume percent, and 6.8 liquid volume percent, respectively. The reported analyses for the reactor liquid product streams of the uniformly cream-colored extrudates are consistent with satisfactory aromatic saturation performance.

Example 8
Effect of Ammonium Nitrate Solution on Zeolite Y Sodium Level

Zeolite Y is commercially obtained which has a unit cell parameter of 24.68 Angstroms and a silicon to aluminum atomic ratio of about 2.5:1, and contains 11.4 percent by weight of aluminum and 9.6 percent by weight sodium. The zeolite Y as commercially obtained is designated 8A.

A portion of the commercially obtained zeolite designated 8A having a mass of 500 grams is blended with a solution consisting essentially of 25 grams of ammonium nitrate and 5,000 milliliters of water. Based on the composition of the solution and the well-known structure of zeolite Y, it is calculated that the solution contains an amount of ammonium ion which is 15 percent of the ammonium ion exchange capacity of the zeolite Y in the blend. The blend is mixed for 40 minutes, filtered, washed, and dried for 12 hours at 250 degrees F. The dried zeolite is designated 8B. The sodium content of the zeolite 8B is analyzed and reported as 8.5 percent by weight of sodium.

This procedure is substantially repeated three times utilizing other portions of the commercially obtained zeolite designated 8A, except that the amount of ammonium nitrate in the solution is varied to produce solutions which are calculated to contain amounts of ammonium ion which are 30 percent, 60 percent, and 300 percent of the ammonium ion exchange capacity of the zeolite Y in the blend, and that the mixing is extended to 1 hour for the 60 percent solution and to 4 hours for the 300 percent solution. The sodium content of the dried zeolites are reported as 7.6, 5.7, and 3.1 percent by weight of sodium, respectively. The dried zeolites are designated 8C, 8D, and 8E, respectively.

Zeolite 8F is produced by subjecting 500 grams of zeolite 8A to a 4 hour periods of mixing with a solution, and to another 4 hour period of mixing with a fresh solution. Each of the solutions consist essentially of 5,000 milliliters of water and an amount of ammonium ion that is 15 percent of the ammonium ion exchange capacity of the zeolite Y in the blend. Between periods, the blend is allowed to settle and is decanted. Finally, the blend is filtered, washed, and dried for 12 hours at 250 degrees F. The sodium content of the zeolite 8B is analyzed and reported as 8.5 percent by weight of sodium.

The procedures and sodium contents for zeolites 8A through 8F are tabulated below in Table III.

TABLE III

| Zeolite Designated | Mixing Time (hours) | Ammonium Ion (% capacity) | Sodium Content (weight %) |
| --- | --- | --- | --- |
| 8A | 2/3 | — | 9.6 |
| 8B | 2/3 | 15 | 8.5 |
| 8C | 1 | 30 | 7.6 |
| 8D | 4 | 60 | 5.7 |
| 8E | 4 | 300 | 3.1 |
| 8F | 4 (twice) | 300 (twice) | 2.5 |

The data in Table III indicates that exposure to an aqueous ammonium nitrate solution alters the sodium content of sodium containing zeolite Y. Additionally, one may reasonably conclude from the data that the loss of sodium can be lessened by limiting the amount of ammonium ion in the solution. For example, it appears that at least about 50 percent of the initial amount of sodium remains with the zeolite Y when the amount of ammonium ion present in the impregnation solution is in the range of about 0.01 to about 60 percent of the ammonium ion exchange capacity of the zeolite. Also, the data is evidence that at least about 75 percent of the initial amount of sodium persists when the amount of ammonium ion is about 30 percent or less of the ammonium ion exchange capacity, and that at least about 85 percent of the initial amount of sodium persists when the amount of ammonium ion is about 15 percent or less of the exchange capacity. If it is practical to entirely exclude ammonium ion from aqueous solutions which come into contact with sodium-containing zeolite Y, one may conclude that essentially all of the sodium will remain.

While Examples and hypotheses have been set forth above in order to better communicate the invention, they are not intended to limit the scope of the invention or of the appended claims. Moreover, other aspects of the invention which will doubtless become apparent to practitioners as a result of studying the teachings are also the intellectual property of the assignee of the present invention.

We claim as our invention:

1. A method for preparing a uniformly impregnated extrudate catalyst including a zeolite, a noble metal and a predetermined amount of sodium, which comprises:

extruding a mixture which includes water, a non-zeolitic refractory inorganic binder selected from the group consisting of alumina, silica, and mixtures thereof, and a zeolite comprising as nonframework cations a major amount of ammonium and a measurable initial amount of sodium to produce an extrudate including the binder and the zeolite;

drying the extrudate at less than about 500 degrees F.;

impregnating a noble metal selected from the group consisting of platinum, palladium, and mixtures thereof on the extrudate by exposing the extrudate to an impregnating solution which includes: (a) an aqueous solvent; (b) a water-soluble compound containing said metal; and (c) an amount of ammonium ions which is in the range of about 0.01 to about 60 percent of the ion exchange capacity of the zeolite and, thereafter, vaporizing the solvent; and calcining the impregnated extrudate to produce a uniformly impregnated extrudate catalyst including said metal, the binder, the zeolite, and a predetermined amount of sodium which is at least about 50 percent of the initial amount;

wherein the extrudate is maintained at less than about 500 degree F. during the period from start of extruding to immediately before impregnating.

2. A method for preparing a uniformly impregnated extrudate catalyst including a zeolite, a noble metal selected from the group consisting of platinum, palladium, and mixtures thereof and a predetermined amount of sodium, which comprises:

extruding a mixture which includes water, a non-zeolitic refractory inorganic binder selected from the group consisting of alumina, silica, and mixtures thereof, and a zeolite comprising as nonframework cations a major amount of ammonium and a measurable amount of sodium in the range of about 1.5 to about 8 weight percent, based on the total weight of the zeolite, to produce an extrudate including the binder and the zeolite in which extrudate the weight ratio of binder to zeolite is in the range of about 5:95 to about 60:40;

drying the extrudate at less than about 500 degrees F.;

impregnating a noble metal selected from the group consisting of platinum, palladium, and mixtures thereof on the extrudate by exposing the extrudate to an impregnating solution which includes: (a) an aqueous solvent; (b) a solute selected from the group consisting of tetrammine palladium chloride, tetrammine, platinum chloride and mixtures thereof; and (c) an amount of ammonium ions which is in the range of about 0.01 to about 60 percent of the ion exchange capacity of the zeolite and, thereafter, vaporizing the solvent; and calcining the impregnated extrudate to produce a uniformly impregnated extrudate catalyst including said metal, the binder, the zeolite, and a predetermined amount of sodium which is at least about 50 percent of the amount of sodium in the aforesaid mixture;

wherein the extrudate is maintained at less than about 500 degree F. during the period from start of extruding to immediately before impregnating.

3. The method of claim 2 wherein the extrudate is maintained at about 350 degrees F. or less throughout the period from the start of extruding to immediately before impregnating.

4. The method of claim 2 wherein the extrudate is maintained at about 250 degrees F. or less throughout the period from the start of extruding to immediately before impregnating.

5. The method of claim 2 wherein at the outset of the extruding the zeolite comprises an amount of ammonium ions as nonframework cations which is equivalent to about 60 percent or more of the ion exchange capacity of the zeolite.

6. The method of claim 2 wherein the amount of ammonium ions in the impregnating solution is equivalent to in the range of about 0.01 to about 25 percent of the ion exchange capacity of the zeolite, and wherein the extrudate catalyst includes at least about 80 percent of the predetermined amount of sodium.

7. The method of claim 2 wherein the amount of ammonium ions in the impregnating solution is equivalent to in the range of about 0.01 to about 10 percent of the ion exchange capacity of the zeolite, and wherein the extrudate catalyst includes at least about 90 percent of the predetermined amount of sodium.

8. The method of claim 2 wherein the zeolite is essentially composed of zeolite Y.

9. The method of claim 2 wherein the binder is composed essentially of alumina.

10. A method for preparing a uniformly impregnated extrudate catalyst including a zeolite, a noble metal selected from the group consisting of platinum, palladium, and mixtures thereof, and a predetermined amount of sodium, which comprises:

extruding a mixture which includes water, a non-zeolitic refractory inorganic binder selected from the group consisting of alumina, silica, and mixtures thereof, and a zeolite comprising as nonframework cations a major amount of ammonium and a measurable amount of sodium in the range of about 1.5 to about 8 weight percent, based on the total weight of the zeolite, to produce an extrudate including the binder and the zeolite, in which extrudate the weight ratio of binder to zeolite is in the range of about 5:95 to about 60:40;

drying the extrudate at less than about 500 degrees F.;

impregnating a noble metal selected from the group consisting of platinum, palladium, and mixtures thereof, on the extrudate by exposing the extrudate to an impregnating solution which includes an essentially ammonium ion-free aqueous solvent and a solute selected from the group consisting of tetrammine palladium chloride, tetrammine platinum chloride and mixtures thereof, including the metal; and calcining the impregnated extrudate to produce a uniformly impregnated extrudate catalyst including the selected noble metal, the binder, zeolite Y, and a predetermined amount of sodium which is at least about 95 percent of the amount of sodium present as nonframework cations in the aforesaid mixture;

wherein the extrudate is maintained at about 500 degrees F or less throughout the period from the start of extruding to immediately before impregnating.

11. The method of claim 10 wherein the extrudate is maintained at about 350 degrees F. or less during the period from the start of extruding to immediately before impregnating.

12. The method of claim 10 wherein the extrudate is maintained at about 250 degrees F. or less during the period from the start of extruding to immediately before impregnating.

13. The method of claim 10 wherein at the outset of the extruding the zeolite comprises an amount of ammonium ions as nonframework cations which is equivalent to about 60 percent or more of the ion exchange capacity of the zeolite.

14. The method of claim 10 wherein the amount of ammonium ions in the impregnating solution is equivalent to in the range of about 0.01 to about 25 percent of the ion exchange capacity of the zeolite, and wherein the extrudate catalyst includes at least about 80 percent of the predetermined amount of sodium.

15. The method of claim 10 wherein the amount of ammonium ions in the impregnating solution is equivalent to in the range of about 0.01 to about 10 percent of the ion exchange capacity of the zeolite, and wherein the extrudate catalyst includes at least about 90 percent of the predetermined amount of sodium.

16. The method of claim 10 wherein the zeolite is essentially composed of zeolite Y.

17. The method of claim 10 wherein the binder is composed essentially of alumina.

18. A method for preparing a uniformly impregnated extrudate catalyst including a zeolite, a noble metal and a predetermined amount of sodium, which comprises:

extruding a mixture which includes water, a non-zeolitic refractory inorganic binder selected from the group consisting of alumina, silica, and mixtures thereof, and a zeolite comprising as nonframework cations a measurable amount of sodium to produce an extrudate including the binder and the zeolite;

drying the extrudate at a temperature higher than about 500 degrees F.;

contacting the zeolite with ammonia gas or with an aqueous solution including a water-soluble ammonium compound at less than about 500 degrees F.;

impregnating a noble metal selected from the group consisting of platinum, palladium, and mixtures thereof on the extrudate by exposing the extrudate to an impregnating solution which includes an aqueous solvent, a water-soluble compound containing said metal, and an amount of ammonium ions which is in the range of about 0.01 to about 60 percent of the ion exchange capacity of the zeolite and, thereafter, vaporizing the solvent; and drying and calcining the impregnated extrudate to produce a uniformly impregnated extrudate catalyst including said metal, the binder, the zeolite, and a predetermined amount of sodium which is at least about 50 percent of the initial amount;

wherein the extrudate is maintained at less than about 500 degree F. during the period from the start of contacting the zeolite with ammonia gas or with an aqueous solution including a water-soluble ammonium compound to immediately before impregnating.

* * * * *